United States Patent [19]

Stubbs et al.

[11] Patent Number: 5,662,067
[45] Date of Patent: Sep. 2, 1997

[54] INSECT REPELLING CAT LITTER

[75] Inventors: John A. Stubbs, Sea Island, Ga.; Donald F. Decker, Miami, Fla.

[73] Assignee: Cherokee Sun Corporation, Fernandia Beach, Fla.

[21] Appl. No.: 638,792

[22] Filed: Apr. 29, 1996

[51] Int. Cl.$^6$ .................................................. A01K 1/015
[52] U.S. Cl. .................................... 119/173; 119/171
[58] Field of Search ................................... 119/173, 168, 119/165, 166, 171, 172, 167

[56] References Cited

U.S. PATENT DOCUMENTS

| | | | |
|---|---|---|---|
| 3,051,661 | 8/1962 | Collins . | |
| 3,286,691 | 11/1966 | McFadden . | |
| 3,774,455 | 11/1973 | Seidler et al. | 73/444 |
| 3,978,818 | 9/1976 | Heldenbrand | 119/170 |
| 3,993,498 | 11/1976 | Koekemoer | 106/456 |
| 3,994,821 | 11/1976 | Seidenberger | 252/192 |
| 4,009,684 | 3/1977 | Kliment et al. | 119/172 |
| 4,013,414 | 3/1977 | Lavallee et al. | 436/163 |
| 4,179,397 | 12/1979 | Rohowetz et al. | 252/408.1 |
| 4,311,512 | 1/1982 | Schwartz | 504/155 |
| 4,326,481 | 4/1982 | Gruss | 119/171 |
| 4,343,751 | 8/1982 | Kumar | 264/37 |
| 4,402,756 | 9/1983 | Prine | 106/457 |
| 4,407,960 | 10/1983 | Tratnyek | 436/1 |
| 4,459,368 | 7/1984 | Jaffee et al. | 502/80 |
| 4,568,518 | 2/1986 | Wolfbeis et al. | 422/56 |
| 4,587,101 | 5/1986 | Marsoner et al. | 422/56 |
| 4,657,881 | 4/1987 | Crampton et al. | 502/80 |
| 4,664,064 | 5/1987 | Lowe | 119/173 |
| 4,671,208 | 6/1987 | Smith | 119/173 |
| 4,685,420 | 8/1987 | Stuart | 119/173 |
| 4,721,059 | 1/1988 | Lowe et al. | 119/172 |
| 4,732,849 | 3/1988 | Seshimoto et al. | 435/12 |
| 4,736,706 | 4/1988 | Lang | 119/173 |
| 4,827,944 | 5/1989 | Nugent | 128/771 |
| 4,844,010 | 7/1989 | Ducharme et al. | 119/173 |
| 4,865,761 | 9/1989 | Mandel et al. | 252/190 |
| 4,925,826 | 5/1990 | Hamm et al. | 502/407 |
| 5,014,650 | 5/1991 | Sowle et al. | 119/171 |
| 5,049,358 | 9/1991 | Lau | 422/56 |
| 5,062,383 | 11/1991 | Nelson | 119/173 |
| 5,064,615 | 11/1991 | Mangold et al. | 422/56 |
| 5,077,222 | 12/1991 | Lau | 436/88 |
| 5,129,365 | 7/1992 | Hughes | 119/173 |
| 5,143,023 | 9/1992 | Kuhns | 119/173 |
| 5,146,877 | 9/1992 | Jaffee et al. | 119/172 |
| 5,229,348 | 7/1993 | Ivie | 502/401 |
| 5,230,305 | 7/1993 | House | 119/171 |
| 5,256,419 | 10/1993 | Roe et al. | 424/407 |
| 5,267,532 | 12/1993 | Franklin et al. | 119/173 |
| 5,317,990 | 6/1994 | Hughes | 119/173 |
| 5,386,803 | 2/1995 | Hughes | 119/173 |

FOREIGN PATENT DOCUMENTS

| | | |
|---|---|---|
| 0076122 | 4/1983 | European Pat. Off. ............... 119/173 |
| 3620-447-A | 6/1986 | Germany . |
| 40 28 933 C2 | 7/1992 | Germany . |
| 5 8009-626 | 7/1981 | Japan . |
| 6 0094-043-A | 10/1983 | Japan . |
| 62-239-932-A | 4/1986 | Japan . |
| 6 3044-823-A | 8/1986 | Japan . |
| 61-284660-A | 12/1986 | Japan . |
| 63-185-323-A | 1/1987 | Japan . |
| 0 1191-626-A | 1/1988 | Japan . |
| WO91/09515 | 7/1991 | WIPO . |

OTHER PUBLICATIONS

Product Literature of KleanHeart Pet Products entitled "Fussy Cat Health Monitor Cat Litter".

Product literature of KleanHeart Pet Products entitled "Fussy CatD The Only Feline Urinary–Indicating Cat Litter".

Product Literature of CatScan™ entitled "Now Making a House Call Is As Easy As Recommending CatScan™".

*Primary Examiner*—Robert P. Swiatek
*Assistant Examiner*—Yvonne R. Abbott
*Attorney, Agent, or Firm*—Marshall, O'Toole, Gerstein, Murray & Borun

[57] ABSTRACT

An insect repellent-containing clay litter material capable of retaining the insect repellent until wetted and then releasing the insect repellent to nearby animals, e.g., cats urinating into the litter material. The insect repellent is impregnated into particles of the clay litter material, and the particles then are coated with a film of water-soluble polymer. When the insect repellent-containing clay is wetted on its polymer coated surface with liquid animal dross, particularly animal urine, such as cat urine, the polymer film is solubilized to permit escape of the insect repellent from the clay particles and the insect repellent is volatilized. Optionally, fragrance impregnated into the litter material together with the insect repellent, continues to provide a fresh smell to the litter material, while the volatile insect repellent, continues to repel invading insects, particularly if the litter box is maintained outdoors.

20 Claims, No Drawings

INSECT REPELLING CAT LITTER

FIELD OF THE INVENTION

The present invention is directed to an insect repellent-carrying litter material formed from insect repellent-impregnated water-absorbent clay particles sealed into the clay particles with a water-soluble polymer film for insect repellent release when wetted. More particularly, the present invention is directed to a water-absorbent particulate cat litter material containing a volatile insect repellent and having a dried film coating of a water-soluble polymer on the surface of the clay particles. The litter material is useful as a cat litter, or as an additive to cat litter for repelling insects. Whenever a cat urinates on the repellent-impregnated cat litter particles, the film coating becomes permeable, thereby releasing a volatile insect repellent from the clay particles onto the cat.

BACKGROUND OF THE INVENTION

Insects and pests have been a major concern of pet owners for many years. For many years, pesticide-impregnated collars have been worn by domestic animals, including cats. Constant wear increases risk of pet poisoning and strangulation in cats. It would be very advantageous to provide a convenient way to periodically contact an animal, e.g., a cat, with an insect repellent, rather than subjecting the cat to constant contact, while maintaining a sufficient insect repellent dosage such that insects and pests are constantly repelled. In accordance with the present invention, this is accomplished by impregnating a clay litter material with an insect repellent and then coating the impregnated clay litter material with a water-soluble polymer, so that the repellent is volatilized and released from the litter material only when wetted.

Some of the patents that disclose the use of clay as an absorbent pet litter material are as follows: Crampton, et al. U.S. Pat. No. 4,657,881; Stuart U.S. Pat. No. 4,685,420; McFadden U.S. Pat. No. 3,286,691; Japanese published patent applications J5 8009-626, J6 3044-823-A, J6 0094-043-A, J6 3185-323-A, J6 2239-932-A, and J0 1191-626-A; German DE 3620-447-A; Ducharme, et. al. U.S. Pat. No. 4,844,010; Kumar U.S. Pat. No. 4,343,751; and Jaffee, et al. U.S. Pat. No. 4,459,368. The following U.S. Pat. Nos. disclose pet litters that include additives, e.g., polymers for clumping, or odor control additives: Lang 4,736,706; Smith 4,671,208; Stuart 4,685,420, Sowle, et al. 5,014,650; and Nelson 5,062,383.

As disclosed in the following U.S. Pat. Nos., it is known to add a pesticide to various cat litter materials: Lowe 4,664,064; Hughes 5,386,803; Prine 4,402,756; Schwartz 4,311,512; Stuart 4,685,420; Lowe, et al. 4,721,059; and Koekemoer 3,993,498. As disclosed in the Lowe U.S. Pat. No. 4,664,064, it is known to spray a vapor-producing pesticide directly onto a cat box filler material, such as clay, in an attempt to provide a pesticide vapor above the cat litter material that will bathe the cat in pesticide when the cat urinates in the litter box containing the pesticide-containing litter material. While this technique may be effective for short time periods, substantially all of the pesticide will be vaporized from such surface-treated clay particles in a short period of time, thereby requiring frequent reapplication of pesticide.

U.S. Pat. No. 5,267,532 discloses incorporating pH-indicating dyes into a water-soluble polymeric film covering an inert substrate that is used as a cat litter additive.

In accordance with the principles of the present invention, it has been found that by coating a water-absorbent clay litter material with a film of water-soluble polymer, after impregnating the clay with a vapor-producing insect repellent, the insect repellent will be released only when the repellent-impregnated litter material is wetted, e.g., when an animal urinates or deposits feces on the litter material.

SUMMARY OF THE INVENTION

In brief, the present invention is directed to an oil-soluble, volatile insect repellent-containing clay litter material capable of retaining the insect repellent until wetted and then releasing the insect repellent to nearby animals, e.g., cats urinating into the litter material. The insect repellent is impregnated into particles of the clay litter material, and the particles then are coated with a film of lipophobic, water-soluble polymer. When the insect repellent-containing clay is wetted on its polymer coated surface with liquid animal dross, particularly animal urine, such as cat urine, the polymer film is solubilized to permit escape of the insect repellent from the clay particles, and the insect repellent is volatilized. When the solubilized polymer coating dries, it once again seals most of the insect repellent within the clay litter material while permitting a relatively low, constant rate of escape of vaporized insect repellent, to provide a constant, low dosage of insect repellent, and optionally a pleasant fragrance, to maintain the litter material substantially free of insects. The litter material, therefore, continues to be fresh smelling, and continues to repel invading insects, particularly if the litter box is maintained outdoors.

Accordingly, one aspect of the present invention is to provide a clay litter material capable of releasing vaporized insect repellent when wetted.

Another aspect of the present invention is to provide a clay litter material impregnated with an oil-soluble, volatile insect repellent and having an overcoating of a water-soluble polymer, so that the oil-soluble, volatile insect repellent is sealed in the clay by the polymer coating until the polymer coating is dissolved by liquid animal dross, e.g., cat urine.

Another aspect of the present invention is to provide a clay cat litter material containing an insect repellent, particularly citronellal, sealed within the clay with a film of water-soluble polymer for release of vaporized citronellal when wetted, and wherein the citronellal is resealed within the litter material when the polymer film dries.

Still another aspect of the present invention is to provide one or more oil-soluble, volatile insect repellents impregnated within the clay litter particles and having a film of water-penetratable or water-soluble polymer over the clay particles such that the insect repellent(s) is sufficiently sealed within the clay litter material such that upon wetting with liquid animal dross, vaporized insect repellent will rise from the litter material for contact with a closely proximate animal.

The above and other aspects and advantages of the present invention will become more apparent from the following detailed description of the preferred embodiments.

DETAILED DESCRIPTION OF THE PREFERRED EMBODIMENTS

The cat litter and cat litter additive materials and methods of the present invention are provided by coating a water-absorbent clay carrier material, previously impregnated with an oil-soluble, volatile vapor-producing insect repellent, with a film or coating of an aqueous solution of one or more water-soluble polymers and then drying the coating material to solidify the polymer film and secure the insect repellent within the clay until the polymer film is solubilized by animal urine. When the polymer film-coated clay carrier material is wetted with liquid animal dross, e.g., cat urine, the water-soluble polymer is at least partially solubilized to allow for escape of insect repellent vapors from the impregnated clay litter material.

The preferred litter box absorbent materials impregnated with an oil-soluble, volatile insect repellent and then coated with a film of water-soluble polymer, in accordance with the present invention, are inexpensive clays, such as calcined clays, such as attapulgite and/or smectite clays, that are safe and non-irritating to the animals, and that absorb substantial amounts of liquids. Other porous, solid litter box absorbent materials that may be used in combination with the clay particles include straw, sawdust, wood chips; wood shavings, porous polymeric beads, shredded paper, sand, bark, cloth, ground corn husks, cellulose, and water-insoluble inorganic salts, such as calcium sulfate. Each of these absorbent materials has the advantage of low cost, and is capable of absorbing a liquid waste product and holding the product within its porous matrices.

The preferred clays useful in accordance with the present invention are attapulgite; or one or more smectite clays such as sodium bentonite, calcium bentonite, and/or Fuller's Earth. These clays effectively absorb animal dross after solubilization of the polymer film coating, in accordance with the principles of the present invention, and release insect repellent-vapors to the animal's fur.

The preferred smectite clays useful in accordance with the principles of the present invention have sodium or calcium, preferably calcium, as the predominant exchangeable cation, although these clays often include a variety of other exchangeable cations in a smaller amount. One or more additional smectite clays, can be added to the sodium and/or calcium bentonite clay. Examples of additional clay additives includes Beidellite, Nontronite, Hectorite and Saponite, or combinations thereof. The attapulgite or smectite clay-based compositions of the present invention also can include Sepiolite additives. The litter box absorbent composition also can include other typically used litter box absorbents such as other clays, sand, or cellulose-based absorbent materials.

In addition, the litter box absorbent material of the present invention optionally can include perfumes, deodorants, odor absorbents, antimicrobial agents, disinfectants and colorants, in an amount sufficient to perform their intended function. The litter box absorbent composition also can include other typically used litter box absorbents, such as sand.

Any vapor producing insect repellent or pesticide or combination of pesticides may be used to impregnate the litter material in accordance with the present invention, such as the dichlorvos, pyrethrin, allethrin, naled and/or fenthion pesticides disclosed in the Lowe U.S. Pat. No. 4,664,064, hereby incorporated by reference.

In order to achieve the full advantage of the present invention, the insect repellent should be predominantly (more than 50% by weight, up to 100% by weight.) citronellal (3,7-dimethyl-6-octanal) which has a boiling point of 47° C., and is the predominant constituent of citronella oil. Citronellal is harmless to animals, thereby exposing the animal to an insect repellent that has no risk of deteriorating the health of or poisoning the animal through constant exposure. Preferably, the insect repellent comprises 60–100% by weight citronella oil (containing about 70% by weight active citronellal) or other source of citronellal, more preferably about 60–80% by weight citronella oil, with the remaining 20–40% being additional insect repellents and/or fragrances, and/or liquid carriers (water and/or organic solvents). Suitable fragrances include geraniol (citral a) and/or nerol (citral b), somewhat vaporizable at the temperature of cat urine and having a lemon odor. While the citronellal does not exterminate insects, it does repel the insects from the animal and provides a pleasant fragrance to the litter material and on the fur and paws of the animal.

The litter material of the present invention is safe, pleasant, and economical and includes a vapor active repellent that is impregnated within the cat litter box. Vapor will result by way of the repellent and fragrance being added and absorbed into the pelletized or granulated clay cat litter material. The cat will be bathed by insect repellent vapor each time it uses the litter box. The vapor repels and controls fleas, ticks, mosquitoes and other pests. The concentration of the repellent is controlled to maximize the efficiency while being completely safe to the cat, while repelling insects from the litter material, while providing the litter material with a pleasantly fragrant odor.

The preferred water-soluble polymer is polyvinylpyrrolidone (PVP) having a monomeric structure as follows:

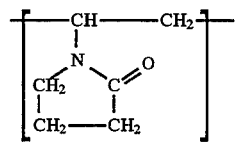

The water-solubility of PVP can be adjusted according to (1) the degree of hydrolysis of the polyvinylpyrrolidone to take into account different thicknesses of PVP/dye films applied over the clay substrate, and (2) by forming a metal salt of PVP, such as sodium or potassium. It is preferred that at least 50% of the PVP monomeric units are hydrolyzed to the structure:

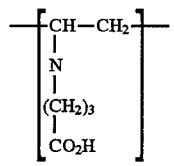

It is preferred that the PVP be used in the salt form, e.g., sodium or potassium polyvinylpyrrolidone and that the polymer is dissolved in water to form an aqueous composition that is coated over the particles of clay litter material in a thickness of about 5 mils to about 25 mils, preferably about 10 mils to about 20 mils. Such PVP coatings provide immediate partial solubility of the polymer film when wetted with animal urine. The molecular weight of the PVP polymer is not critical so long as the PVP is water-soluble. Excellent results can be obtained with PVP having weight average molecular weights in the range of about 225 to about 1,000,000 or more, preferably about 2,000 to about 100,000.

Other PVP derivatives that are water-soluble and function well as the binding polymer for binding one or more water-soluble dyes to the surface of an inert substrate include the following: N-Methylpyrrolidone (NMP); N-Ethylpyrrolidone (NEP); and N-Vinylpyrrolidone, having the structures:

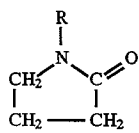

NMP: R=CH$_3$

NEP: R=CH$_3$CH$_2$

NVP: R=CH$_2$:CH

Other substituted water-soluble pyrrolidones useful in accordance with the present invention include: N-isopropyl-5-methylpyrrolidone; pyrrolidone-N-acetic acid; N-cyclohexyl-pyrrolidone; and hexamethylene-bis(2-pyrrolidone). It appears that best results for polyvinylpyrrolidone and its derivatives are achieved when the PVP has about 80% to about 90% of its monomer units hydrolyzed.

Other water-soluble polymers useful to reversibly seal the insect repellent within the clay litter material include polyvinyl alcohol (PVA); and poly(ethylene oxide) having monomer units: ─[O─(CH$_2$)─(CH$_2$)]─ hereinafter PEO; available as PLURACOL E from Wyandote, and POLYOX WSR or CARBOWAX from Union Carbide—water-soluble even at the very high molecular weights, e.g., 1,000,000 or more; poly(propylene oxide), having monomer units:

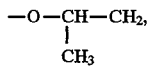

water-soluble only in the oligomer form, having weight average molecular weights from about 100 to about 1,000, preferably about 100 to about 500; poly(vinyl methyl ether), having monomer units:

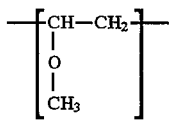

and their hydrolysis product derivatives. Poly(vinyl methyl ether) is water-soluble and available commercially as GANTREZ M from GAF Corporation and is water-soluble, like PEO, at room temperature, at very high molecular weights, e.g., from about 120 to about 1,000,000 and more. Another suitable water-soluble polymer is polyoxymethylene (POM), having monomer units ─[O─CH$_2$]─ which are water-soluble in the very short oligomer form, i.e., poly (formaldehyde) and having a melting point of about 180° C., and weight average molecular weights from about 40 to about 400. Oxide copolymers also are suitable as the water-insoluble binding polymer, including random and block copolymers of poly(ethylene oxide) with a variety of monomers, including propylene oxide and/or poly (propylene oxide). One particularly-useful copolymer is sold as PLURONIC F68 having a poly(propylene oxide) core molecular weight of about 1,800 and including 80% w/w ethylene oxide units, giving a combined molecular weight for the two outer poly(ethylene oxide) sections of 6,600— for a combined weight average molecular weight of 8,400.

The polyacrylic acid polymers also are suitable, having monomer units:

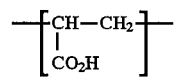

and are commercially available as CARBOPOL resins from B. F. Goodrich and PRIMAL resins from Rohm & Haas. Light cross-linking will slightly hinder the water-solubility for better adherence of the polymer to the surface of the clay particles.

Other, water-soluble polymers and copolymers, including derivatives of, and substituted polyacrylic acid are disclosed in Franklin, et al. U.S. Pat. No. 5,267,532, hereby incorporated by reference.

The litter material of the present invention is prepared, in accordance with a preferred embodiment, as in the following example:

EXAMPLE

To prepare 100 lb. citronellal-treated Fuller's Earth, proceed as follows 1. a. weigh out 9 lbs of Fuller's Earth;

b. prepare the citronellal-containing blend as follows:

| Example | Range (wt % of dry clay) | Preferred (wt % of dry clay) | More Preferred (wt % of dry clay) | Most Preferred (wt % of dry clay) |
|---|---|---|---|---|
| 1a) citronella oil - 0.70 lb | 0.005–30 | 1–20 | 4–15 | 5–10 |
| 2b) geraniol - 0.03 lb | 0–10 | 0.005–5 | 0.1–0.50 | 0.2–0.4 |
| 3c) tea tree oil - 0.12 lb | 0–10 | 0.1–5 | 0.5–3 | 1–2 |
| 4d) fragrance - 0.15 lb | 0–10 | 0.1–5 | 0.5–4 | 1–2 |

Mix all ingredients together as shown, thoroughly.

c. Mix the Fuller's Earth and citronella oil and blend together. Mix until all the oil has been absorbed by the Fuller's Earth.

2. Preparation of 10% PVP (polyvinylpyrrolidone) solution:

(a) prepare 1.7 lb of an 80% isopropyl solution. (4:1 isopropanol to water)

(b) weigh out 0.30 lb PVP resin and add to part (a). Mix until the PVP is completely dissolved.

3. Spray the PVP solution (part 2) over the impregnated Fuller's Earth (part 1) with mixing while passing warm (room temperature) air over the blend. Continue this step until the PVP film on the Fuller's Earth is dry. Weight percent range of water-soluble polymer film: 0.05–5% by weight of dry clay. Preferred range: 0.1–2% by weight of dry clay; more preferred range: 0.1–1%; most preferred range: 0.2–0.5%.

4. Add the citronellal-treated Fuller's Earth (10.3 lb) to 89.7 lb untreated Fuller's Earth. Mix thoroughly. Weight percent range of impregnated, polymer-coated clay particles, based on the total weight of litter material: 5–100%; preferred range: 6–30%; more preferred range: 8–15%; most preferred range: 8–12%.

Many modifications and variations of the invention as hereinbefore set forth can be made without departing from the spirit and scope thereof and therefore only such limitations should be imposed as are indicated by the appended claims.

What is claimed is:

1. An insect repellent litter material comprising particles of a water-absorbent clay impregnated with about 0.5% to about 10% by weight of an insect repellent, said impregnated clay particles including a film of water-soluble polymer on an outer surface of each insect repellent impregnated particle thereof.

2. The litter material of claim 1, wherein the insect repellent comprises citronellal.

3. The litter material of claim 2, wherein the litter material is impregnated with citronella oil as the source of citronellal.

4. The litter material of claim 1 further including a fragrance in an amount of about 0.1% to 5% based on the dry weight of the clay.

5. The litter material of claim 4, wherein the fragrance is selected from the group consisting of citral a, citral b, and mixtures thereof.

6. The litter material of claim 1, wherein the water-absorbent clay is selected from the group consisting of attapulgite clay, smectite clay, and mixtures thereof.

7. The litter material of claim 6, wherein the clay is attapulgite clay.

8. The litter material of claim 6, wherein the clay is a smectite clay selected from the group consisting of sodium montmorillonite, calcium montmorillonite, and mixtures thereof.

9. The litter material of claim 8, wherein the clay is Fuller's Earth.

10. The litter material of claim 1, wherein the water-soluble polymer is selected from the group consisting of polyvinylpyrrolidone; a metal salt of polyvinylpyrrolidone; polyvinyl alcohol; poly(ethylene oxide); polyacrylic acid; and mixtures thereof.

11. A method of manufacturing an insect-repelling litter material comprising:

impregnating particles of a water-absorbent clay with a liquid insect repellent in an amount of about 0.5% to about 30% by weight, based on the dry weight of the water-absorbent clay;

coating the impregnated clay particles with a liquid film of a water-soluble polymer; and drying the liquid film of water-soluble polymer.

12. The method of claim 11, further including mixing the insect-repelling litter material manufactured in accordance with claim 11 together with particles of water-absorbing clay that have not been impregnated with an insect repellent in proportions of about 5% to about 95% impregnated clay particles to about 5% to about 95% non-impregnated clay particles.

13. The method of claim 12, wherein the insect-repellent impregnated clay particles comprises about 6% to about 30% by weight of the litter material, based on the total dry weight of the litter material.

14. The method of claim 11, wherein the insect repellent comprises citronellal.

15. The method of claim 11, wherein the litter material is impregnated with citronella oil as the source of citronellal.

16. The method of claim 15, further including a fragrance in an amount of about 0.1% to 5% based on the dry weight of the clay.

17. The method of claim 11, wherein the water-absorbent clay is selected from the group consisting of attapulgite clay, smectite clay, and mixtures thereof.

18. The method of claim 17, wherein the clay is a smectite clay selected from the group consisting of sodium montmorillonite, calcium montmorillonite, and mixtures thereof.

19. The method of claim 16, wherein the fragrance is selected from the group consisting of citral a, citral b, and mixtures thereof.

20. A method of periodically contacting a cat with insect repellent vapors comprising impregnating a particulate water-absorbent litter material with about 0.5% to about 10% by weight, based on the dry weight of the litter material, of an insect repellent, said impregnated clay particles including a film of water-soluble polymer on an outer surface of each insect repellent impregnated particle thereof, such that when the cat urinates on the repellent-impregnated litter material, a portion of the polymer film dissolves, such that the insect repellent is released from the particulate litter material in vapor form for contact against the cat.

* * * * *